United States Patent [19]

Horton

[11] Patent Number: 5,592,902

[45] Date of Patent: Jan. 14, 1997

[54] METHOD AND APPARATUS FOR COOPING CHICKENS

[75] Inventor: Herbert D. Horton, Louisville, Miss.

[73] Assignee: The Taylor Group, Inc., Louisville, Miss.

[21] Appl. No.: 342,493

[22] Filed: Nov. 21, 1994

[51] Int. Cl.$^6$ .................................................. A01K 29/00
[52] U.S. Cl. ........................................................ 119/846
[58] Field of Search .................................. 119/712, 713, 119/843, 846, 845

[56] References Cited

U.S. PATENT DOCUMENTS

| | | | |
|---|---|---|---|
| 3,672,335 | 6/1972 | Sanders | 119/82 |
| 4,074,658 | 2/1978 | Mermelstein et al. | 119/846 |
| 4,301,769 | 11/1981 | Mola | 119/82 |
| 4,467,745 | 8/1984 | Ledwell et al. | 119/846 |
| 4,508,062 | 4/1985 | Berry et al. | 119/82 |
| 4,513,689 | 4/1985 | Berry et al. | 119/82 |
| 4,567,852 | 2/1986 | Ledwell et al. | 119/846 |
| 4,569,308 | 2/1986 | O'Neill et al. | 119/82 |
| 4,600,351 | 7/1986 | Nelson | 119/846 |
| 4,669,423 | 6/1987 | van den Brink | 119/846 |
| 4,766,850 | 8/1988 | O'Neill | 119/846 |
| 4,900,292 | 3/1990 | Berry et al. | 474/84 |
| 5,259,811 | 11/1993 | Berry | 452/183 |
| 5,325,820 | 7/1994 | Briggs et al. | 119/846 |
| 5,385,117 | 1/1995 | Hollis et al. | 119/846 |

Primary Examiner—Gene Mancene
Assistant Examiner—Thomas Price

[57] ABSTRACT

A cooping apparatus by which a large number of chickens, such as may be found growing within a chicken house, are mechanically transferred into a multi-tiered coop. A conveyor is supported along the length of a boom, and a chicken gathering apparatus is supported from the depending end of the boom for gathering the chickens onto the boom conveyor, which moves them onto an elevated intermediate conveyor system. Overlying the conveyor system is a pivotally mounted set of distribution vanes that uniformly distributes the chickens as they continue to move along the conveyor system towards the receiving end of a transfer divider. The transfer divider divides the chickens into a plurality of horizontal parallel paths, each path leading into the compartments of one tier of a multi-tiered coop that is supported on the rear of the machine. An elevator device sequentially positions the discharge from the transfer divider respective to each of the tiers of the coop being loaded so that the chickens are discharged from the divider, where they move along the horizontal parallel paths, into appropriate compartments of a selected tier of the coop. The loaded and empty coops automatically are moved into a position convenient for a forklift vehicle to engage and remove from the cooping apparatus.

27 Claims, 9 Drawing Sheets

METHOD AND APPARATUS FOR COOPING CHICKENS

BACKGROUND OF THE INVENTION

The present invention teaches a chicken harvesting and cooping apparatus supported on a vehicle by which the apparatus can be maneuvered inside of a chicken house as well as down a highway. It should be understood that throughout this disclosure the term "chicken", as used herein, is intended to include chickens, turkeys and ducks, and any other commercially grown fowl that advantageously can be gathered or harvested by the present invention. The present invention sets forth both method and apparatus for translocating chickens from a chicken house or chicken growing area into commercial chicken coops.

In the prior art, it is common practice for a fork lift to bring to the chicken cooping machine an empty coop which must be placed on the ground temporarily while a filled coop is removed from the machine. To prevent the machine being idle during the subsequent operation, the filled coop is temporarily set down, then the empty coop is again picked up and set on the machine; and, thereafter, the full coop is again picked up and loaded onto a truck. Then the forklift brings another empty coop to the cooping machine as the operation is repeated in the before described time consuming manner.

This time consuming duplication of effort is expensive because all of the extra maneuvering slows down the main operation of gathering and cooping the chickens with the chicken cooping machine. Hence loading and unloading the empty and filled coops is a bottle-neck that reduces the efficiency of prior art chicken cooping machines.

The legal road width usually limits the width of most vehicles to 8 or 8.5 feet which prevents most any chicken cooping machine to be built with adequate width for simultaneously accommodating both a full and an empty chicken coop, unless the coop support is elevated above the support wheels of the cooping machine. This necessitates fabricating the cooping machine at an excessive elevation. Therefore simultaneously accommodating and manipulating both an empty and a full coop in conjunction with a chicken cooping machine is not found in the prior art.

Another factor that limits the width of a cooping machine is the width of the entrance into the chicken house, which sometimes is inadequate for admitting a chicken gathering machine having a width adequate for simultaneously handling both an empty coop and a full coop.

The standard commercial chicken coop is a multi-tiered coop, five tiers high, with each tier being divided into three individual compartments. The compartments of each tier is provided with horizontal, over-the-center, spring loaded doors for accepting and discharging chickens therethrough. Transferring a uniform weight of chickens into the individual compartments of a tier is not always possible with prior art machines, and often too many chickens are packed into one compartment, while too few are caged in another. This results in losses during hot weather. Therefore it is desirable to be able to coop chickens in such a manner that a predetermined number of chickens is automatically translocated into each of the individual compartments of a standard coop.

Another drawback of a chicken cooping machine is the difficulty of properly arranging the standard commercial multi-tiered coop in proper aligned relationship respective to the discharge of the chicken cooping machine. In addition to the difficulty of properly aligning the horizontally disposed compartments of the vertically spaced tiers with the chicken discharge of the cooping machine, it is also necessary to sequentially align each of the individual vertically spaced tiers with the chicken discharge so that each compartment of each tier is suitably filled. This is especially difficult to achieve because the large coop must first be moved into a proper position where it can be engaged by the tilting apparatus, where it is then tilted away from a vertical plane in order to assume an angle that is sufficient for the chickens introduced through the coop entrance to gravitate towards the back of the individual compartments, thereby leaving room for additional chickens.

One of the most important subcombinations of this invention is the apparatus for engaging and moving the chickens that are on the floor of the chicken house, and translocating the caught chickens to another part of the cooping machine. This is accomplished by a boom that extends from the chicken cooping machine, and has a gathering head supported at the far end thereof, hereinafter referred to as the gathering end.

The present invention, as will be appreciated by those skilled in the art after studying this disclosure, provides improvements over all known prior art chicken gathering and cooping apparatus by sequentially moving chickens from a flock of chickens onto a conveyor means where the chickens are transported to another part of the apparatus where they are cooped. By the present invention it is possible to sequentially gather chickens in either of one or two parallel streams, thereby doubling the flow of chickens thereinto; or, reducing the flow of chickens, as may be desired, all of which increases the utility of the cooping apparatus. This is achieved by an improved gathering head which catches and deposits the caught chickens onto a moving conveyor in a new, unobvious, and improved manner.

The present invention overcomes many other problems and drawbacks associated with the prior art by the provision of an improved gathering head in combination with an improved apparatus for the discharge of chickens into the individual compartments of a tier of a chicken coop, and, also improvements in the handling of the filled and empty coops. Both method and apparatus by which these desirable and novel attributes are realized are the subject of the present invention.

SUMMARY OF THE INVENTION

This specification sets forth the precise invention for which a patent is solicited, in such manner as to distinguish it from other inventions and from what is old. This invention comprehends method and apparatus for harvesting commercially grown chickens by translocating the chickens from a flock of chickens within a chicken house into a multi-tiered coop in a new and unobvious manner.

Specifically, the improved apparatus of this invention includes a vehicle having a main frame, with one end an elongated boom being pivotally mounted to the forward end of the main frame, and a coop support being mounted to the trailing end thereof. A gathering head is suitably mounted to the opposed end of the boom.

In the preferred embodiment of the invention, the gathering head apparatus comprises a pair of rotatable sweep members mounted to rotate about perpendicularly arranged axis, and having radially arranged elements mounted thereon for rotatably engaging chickens therebetween, and gently urging caught chickens to sequentially move therethrough, thereby harmlessly sweeping the chickens onto a boom conveyor.

The boom conveyor is supported along the length of the boom, and a special hollow journal means attaches a pivoted end of the boom to the main frame of the vehicle to allow the gathering head to be moved simultaneously in a vertical and a horizontal plane.

Multi-tiered coops are positioned adjacent the trailing end of said main frame and manipulated automatically, in such a manner that there is always an empty next coop available after a last coop has been filled and positioned for unloading.

The unique chicken gathering head of this invention gathers chickens from a flock of chickens and arranges the caught chickens in a row onto the boom conveyor which moves the row of chickens in a continuous stream to a boom conveyor discharge end located at the pivoted end of the boom conveyor. An intermediate conveyor system, comprising several conveyor means, is arranged respective to the hollow journal at the discharge end of the boom conveyor for receiving the chickens discharged from the boom conveyor. As the chickens travel along the intermediate conveyor system on their way towards a coop, the stream of chickens encounter a novel transfer divider means which evenly divides the stream into one of a plurality of parallel paths, each simultaneously leading into the individual compartments of the plurality of tiers of the multi-tiered coop, all in a manner heretofore unknown to those skilled in the art.

A novel elevator means vertically positions the transfer divider device respective to the vertically spaced tiers of the coop to evenly distribute the several parallel paths of chickens discharged from the divider directly into the several compartments of a selected tier of the coop. At the same time, the discharge from the intermediate conveyor system is properly aligned with the vertically traveling transfer divider device for orderly transferring chickens therebetween.

Therefore, a primary object of the present invention is the provision of method and apparatus for harvesting commercially grown chickens by translocating chickens growing within a chicken house into a multi-tiered coop in a new and unobvious manner.

Another object of the invention is to provide a gathering apparatus comprising a pair of rotatable sweep members mounted to rotate about perpendicularly arranged axis, and having radially arranged elements thereon for rotatably engaging and urging chickens to move therethrough and thereby sweeping them onto a boom conveyor that is supported along the length of a boom.

A further object of this invention is to disclose and provide a chicken gathering apparatus for gathering chickens onto a conveyor, which moves the chickens onto a conveyor system where the chickens are transported to a transfer divider means. At the transfer divider means the chickens are divided into one of a plurality of horizontal parallel paths, each leading to the individual compartments of one of a plurality of tiers of a coop.

A still further object of this invention is to provide a novel elevator and transfer divider means which is sequentially arranged in indexed relationship respective to consecutive adjacent tiers of a multi-tiered coop, whereby a plurality of pairs of contra-rotating sweep members, each having radially arranged elements thereon, engage and urge the chickens received from a group of chickens to move along several parallel rows therethrough and into the coop.

Still another object of this invention is to provide a chicken cooping apparatus with a novel elevator means that vertically positions a transfer divider device respective to the vertically spaced tiers of a coop to evenly distribute chickens discharged therefrom into the several compartments of a selected tier of the coop.

A further object of this invention is to provide means for tilting a multi-tiered coop into a predetermined position adjacent an elevator means which vertically positions a transfer divider device respective to the vertically spaced tiers of the coop to evenly distribute the chickens discharged from the divider means directly into the several compartments of a selected tier of the coop, while at the same time, the discharge from a conveyor system is properly aligned with the vertically traveling transfer divider device for orderly transferring chickens therebetween.

A still further object of this invention is to provide apparatus for manipulating coops automatically into a predetermined position adjacent the trailing end of said main frame, in such a manner that there is always an empty next coop available after a last coop has been filled and positioned for unloading from the main frame.

These and various other objects and advantages of the invention will become readily apparent to those skilled in the an upon reading the following detailed description and claims and by referring to the accompanying drawings.

The above objects are attained in accordance with the present invention by the provision of a method for use with apparatus fabricated in a manner substantially as described herein.

BRIEF DESCRIPTION OF THE DRAWINGS

FIG. 12 is a broken, top plan view of the apparatus seen in FIG. 11, with some additional pans thereof being broken away or removed therefrom to better illustrate important details thereof; and, FIG. 13 is an enlarged, partly dissembled, cross-sectional view taken along line 13—13 of FIG. 11.

DETAILED DESCRIPTION OF THE PREFERRED EMBODIMENTS

This invention sets forth both method and apparatus for mechanically cooping chickens by translocating the chickens from a flock of chickens living within a commercial chicken house, for example, into a multi-tiered commercially available chicken coop.

Figure 1:
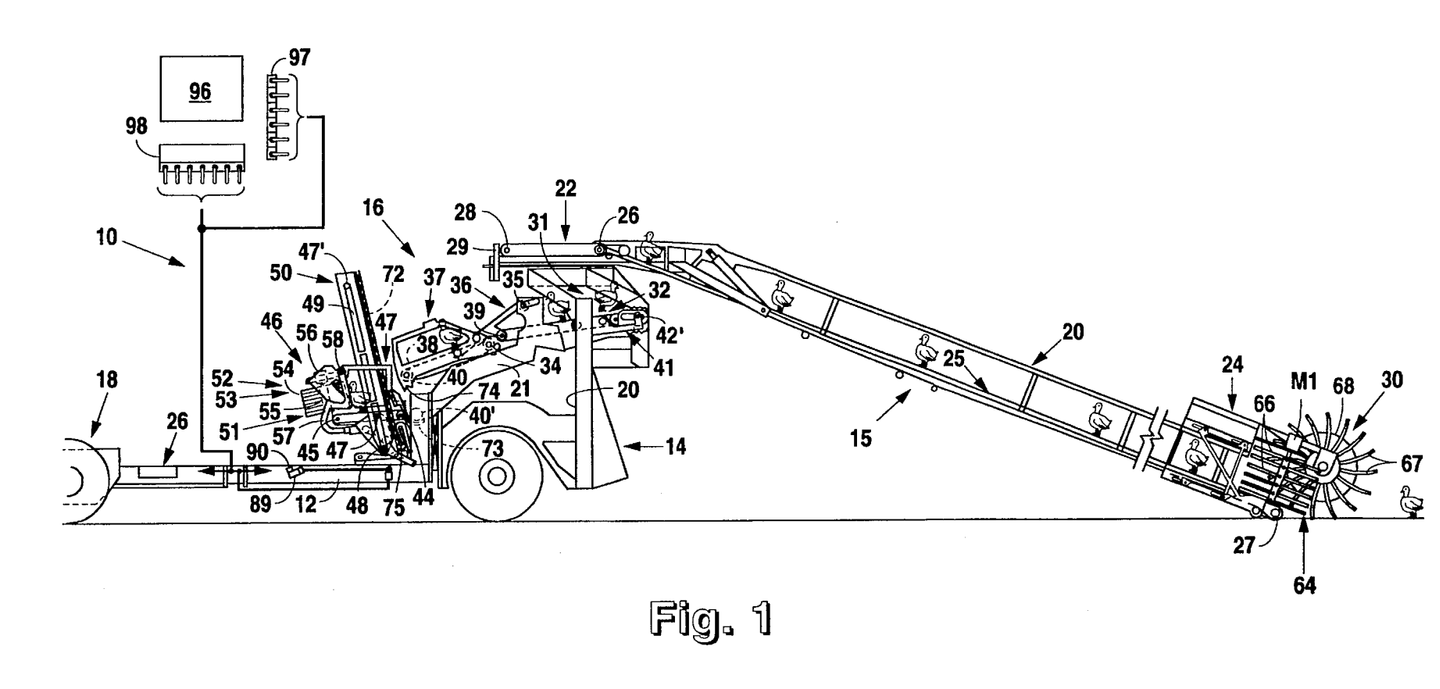
FIG. 1 is a side elevational view of the present invention, with some parts thereof being broken away or removed therefrom to conserve space and to better illustrate important hidden details thereof.

Specifically, as seen illustrated in various Figures of the drawings, the preferred embodiment of the chicken cooping apparatus 10 of the invention comprises a main frame 12 having a forward boom support end 14 to which a near end of a boom 15 is pivotally mounted. In FIG. 1, together with other Figures of the drawings, a cooping central part 16 is located between the forward boom support end 14 and a rear coop storage part 18, the latter of which terminates in the trailing end of the main frame 12. A number of support members 20 and 21 are mounted at the opposed sides of the forward end 14 of the main frame 12 and serve as a means by which the numerous mechanical apparatus of the invention are suitably supported at various elevations respective to the main frame 12.

Figure 2:
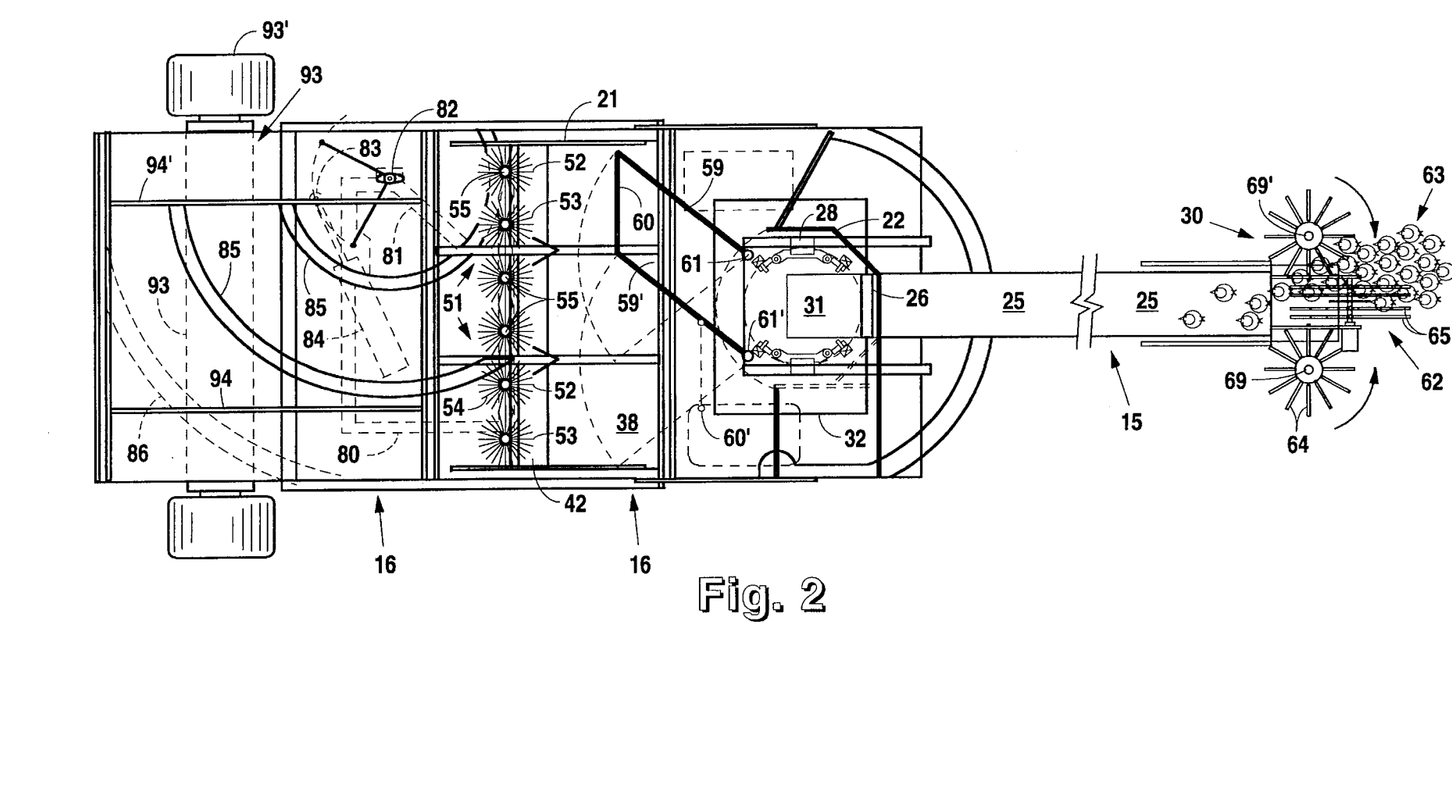
FIG. 2 is a top plan view of the apparatus of FIG. 1, with some parts thereof being broken away and removed therefrom to illustrate some additional details thereof.

In FIGS. 1 and 2, the upper end of the vertical support 20 is built up into the illustrated framework which suitably receives a pivoted end 22 of the boom 15. The opposed boom ends, 22 and 24, more or less coincide with the opposed ends of a first or boom conveyor means 25, such that the boom conveyor is supported along the length of the boom. Hence, the upper run of the boom conveyor forms an upper surface of the boom. The opposed ends of the boom conveyor 25 terminate at journeled conveyor ends 26 and 27 thereof. Opposed sides of the boom are provided with a longitudinally extending wall which prevent chickens from falling off the conveyor.

Journal means 28 attach the boom pivoted end 22 to the forward end 14 of main frame 12 in a manner such that the boom gathering end 24 can be moved vertically about a horizontal axis formed at the journal means 26. Additionally, a hollow turntable 29 forms a large hollow journal by which the boom pivoted end 22 can be rotated about a vertical axis and thereby pivot the gathering end 24 in a horizontal plane. Thus the boom end 24 can simultaneously be moved in a vertical and a horizontal plane.

In FIGS. 1, 2, and 11–13, a chicken gathering apparatus 30, made in accordance with this invention, is supported from the boom gathering end 24 for gathering nearby chickens onto the receiving or gathering end 24 of the first conveyor means 25. The uncaught chickens may be living within a commercial chicken house, and when they encounter the gathering apparatus 30, they are caught and sequentially removed from the floor of the chicken house onto the receiving end of the first conveyor means 25. The caught chickens are content to ride on the conveyor 25 from the gathering end 24 up beyond conveyor end 26, where the caught chickens fall through the large, hollow, boom pivot that forms a chute at 31. The chute 31 underlies the boom conveyor discharge end (near 26) located near the boom pivoted end 22.

Figure 8:
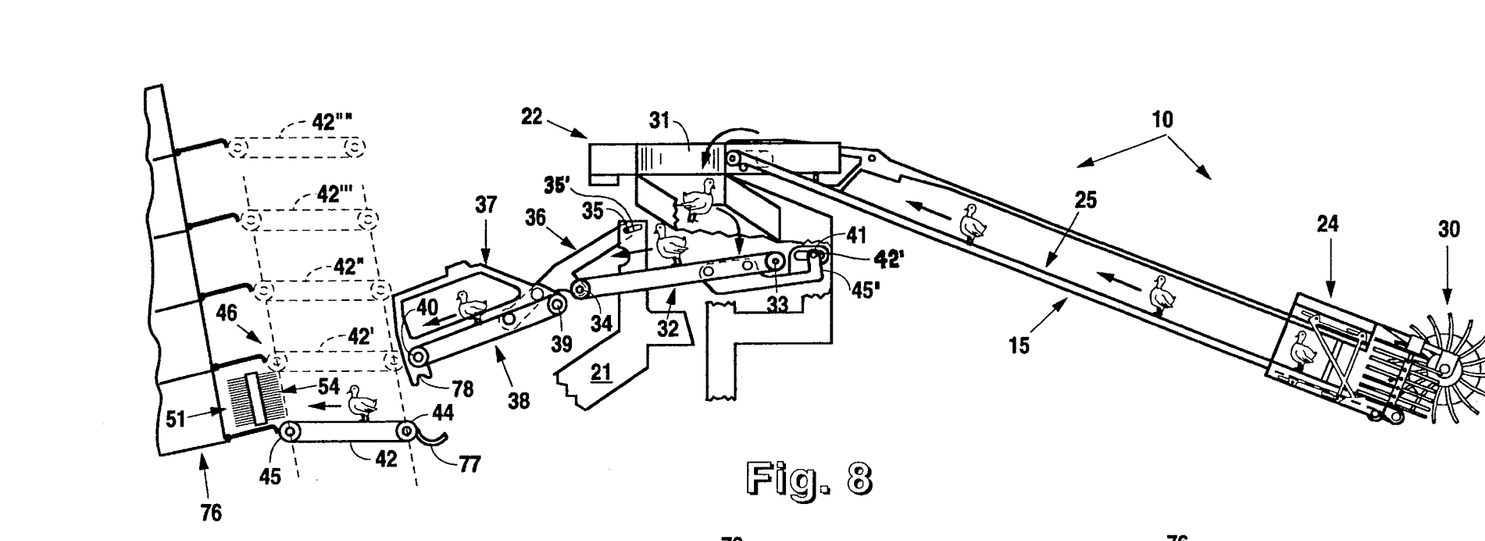

As particularly illustrated in FIGS. 1, 2, 4 and 8, the arrow at numeral 31 illustrates the path of the chickens as they gravitate from end 26 of the first conveyor means 25, also called the boom conveyor means 25, through the illustrated short chute 31, where they are received by a second conveyor means 32. In FIG. 8, the second conveyor means 32 has a receiving end 33 opposed to a discharge end 34. The receiving end 33 underlies the chute 31 that communicates with the discharge of the first conveyor means 25.

The before mentioned supports 21, which form opposed intermediate conveyor supports, are fixed respective to the main frame 12. The supports 21 upwardly and forwardly extend to terminate in a pivot journal 35 received within a slot 35', and thereby captures one end of an arm of a crank 36 for pivotal and slidable movement therewith. The discharge end 34 of conveyor means 32 is journaled for pivotal movement to the end of a second arm of the crank 36 in spaced relationship respective to pivot journal 35.

Figure 5:
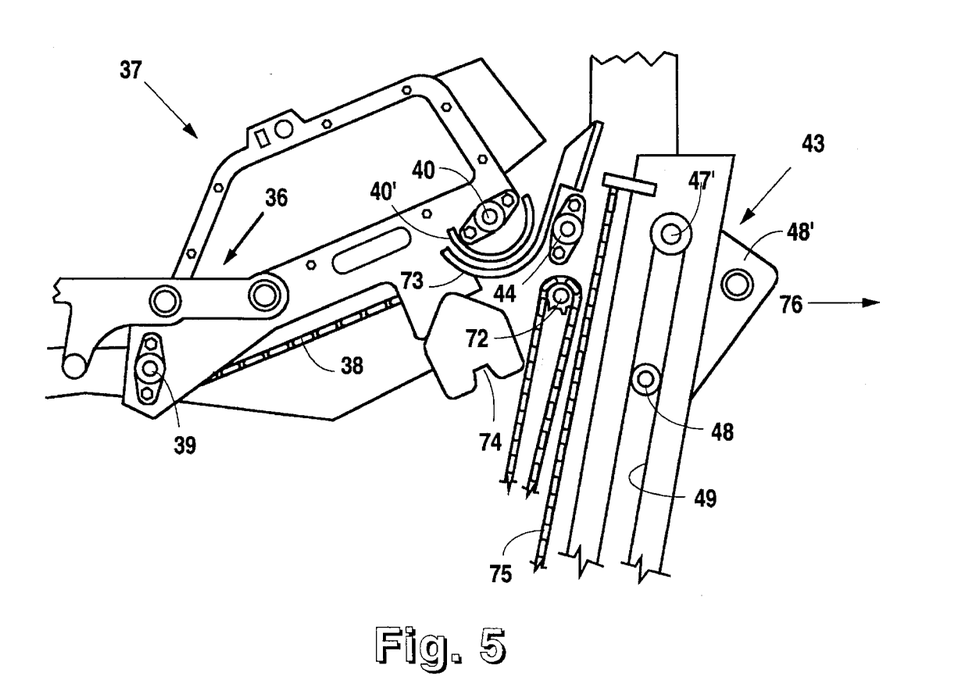
FIG. 5 is an isolated, fragmentary, detailed, side view of part of the apparatus disclosed in FIGS. 1–3.

In FIGS. 2, 5 and 8, the crank 36 is affixed to a support frame 37, the latter of which is covered with thin metal to form opposed vertical sidewalls for the third conveyor 38, so that chickens are restrained from falling off the sides thereof. The opposed ends 39 and 40 of third conveyor 38 are supported by attaching the journals thereof to the lower member that forms the lower side of the quadrilateral configured support frame 37. The opposed ends 34 and 33, respectively, of conveyor 32 are supported by the conveyor support member 36 and 45', respectively, the latter of which terminates in a journal at 41 that is received within the illustrated slot 42' therefor. This structure mounts the conveyors 32 and 38 such that they are always aligned with one another to form an intermediate conveyor system connected for delivering chickens between the boom conveyor 25 and the last or fourth conveyor 42.

The fourth conveyor means 42 of FIGS. 1 and 5–8 has a receiving end 44 spaced from an opposed discharge end 45. The opposed ends 44, 45 of the fourth conveyor means 42 are mounted on the illustrated carriage 43, together with other parts thereof that jointly comprise a transfer divider 59 (see FIG. 2) and discharge apparatus 46 (see FIGS. 1, 6, and 7) of this invention. The receiving end 44 of the fourth conveyor means 42 of the transfer divider and discharge apparatus 46 is positioned to receive chickens that gravitate from the discharge end 40 of the third conveyor 38 of the intermediate conveyor system.

The arm of crank 36, frame 37, and conveyor support 45' (see FIG. 8) are therefore attached to one another in a manner to admit limited pivotal movement of the discharge end 40 of the intermediate conveyors 32, 38 about the pivot at journal 41 within the limits afforded by the cooperative action of both slots 35' and 42'. This cooperative action allows the discharge at 40 of the intermediate conveyor system to be positioned in aligned relationship with respect to the fourth conveyor 42, the latter of which forms part of the transfer divider and discharge apparatus 46, and therefore moves vertically for accessing either of the illustrated five coop tiers.

The conveyor journals located at discharge end 40 of the intermediate conveyor system forms a pickup point at opposed sides thereof, as will be better appreciated later on in this disclosure. For the moment it should be understood that the intermediate conveyor system can be pivotally moved about the illustrated pivot that is captured in the slot at 42' thereof, while slot 35 allows limited pivotal movement of the conveyors 32 and 38 from the illustrated position of FIG. 1 into a plurality of elevated positions illustrated in FIGS. 7 and 8 by lifting the frame 37 at pickup point 40' in the illustrated manner of FIGS. 1 and 5–8.

Figure 6:
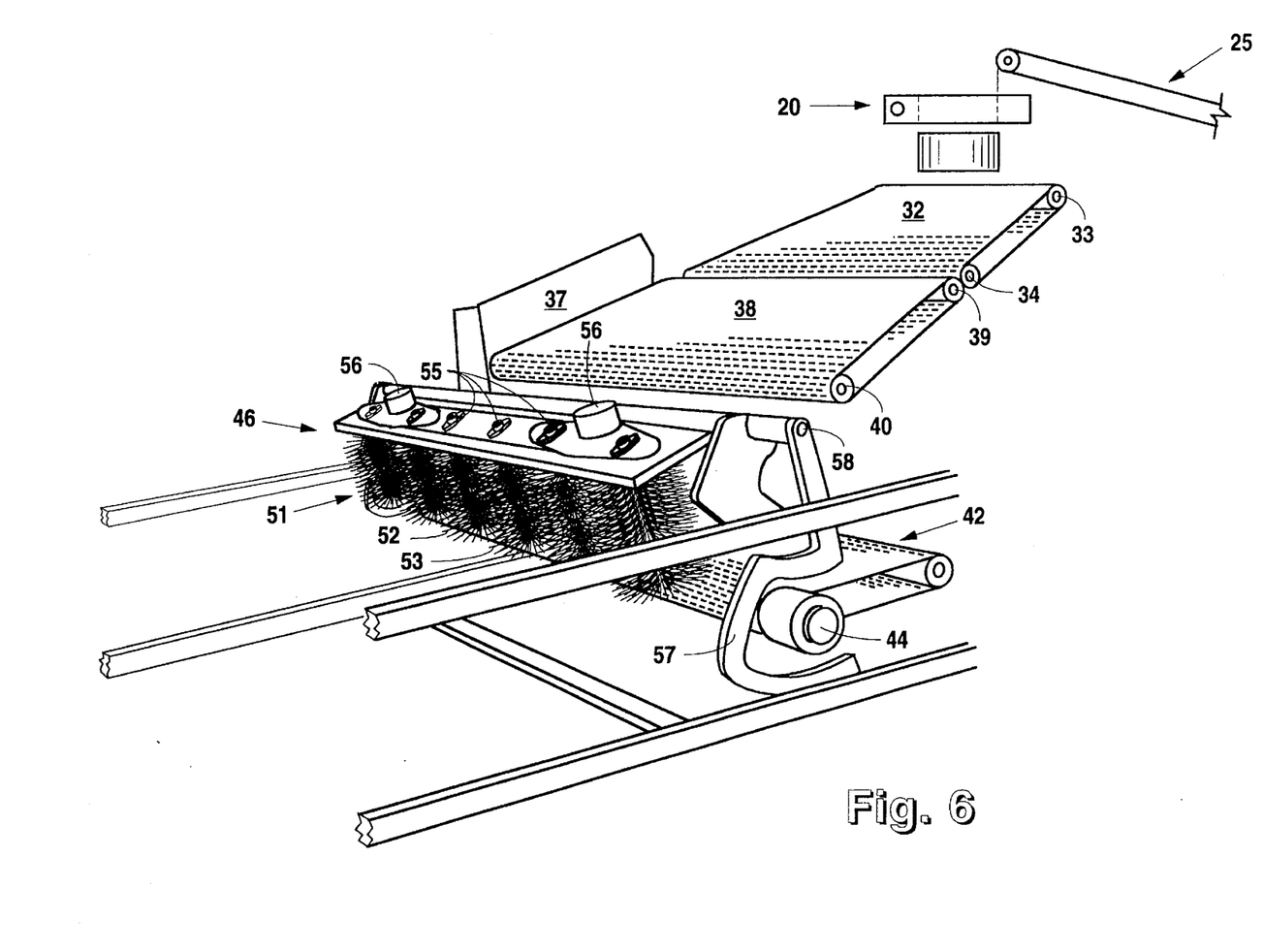
FIG. 6 is a fragmented, three-quarter perspective view showing part of the gathering and cooping machine of this invention in another operative configuration.
Figure 7:
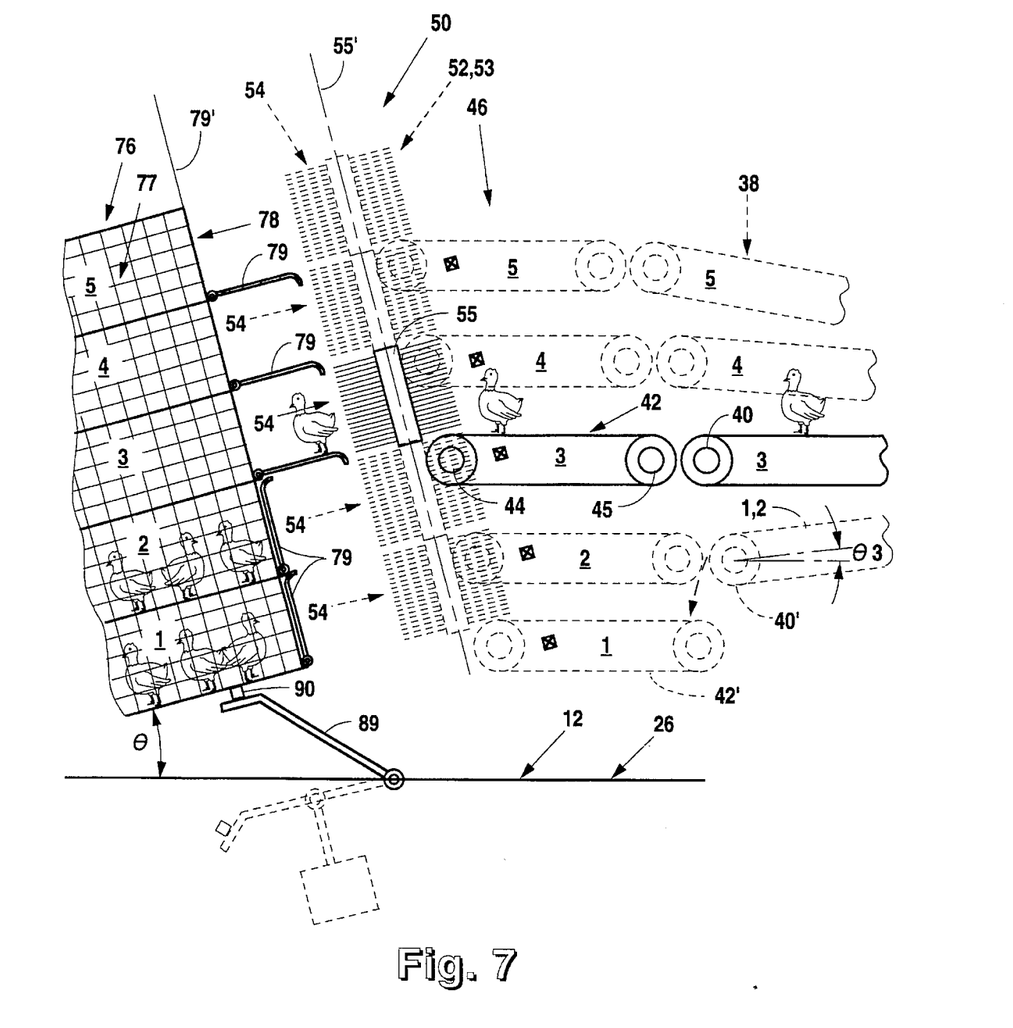
FIGS. 7 and 8 set forth a part schematical, part diagrammatical, side view showing the operation of pan of the apparatus disclosed in the foregoing Figures FIG. 9 are top plan views diagrammatically illustrating the operation of pan of the apparatus of the invention.

As best seen illustrated in FIG. 5, the transfer divider and discharge means 46 includes a carriage 43 mounted on rollers 47' and 48, which are captured for movement within guides or slots 49 formed in the sloped support 50, all of which forms a novel elevator means which is arranged in the manner of FIG. 1, 2 and 6–8; and which positions or registers the transfer divider means 46 respective to the individual horizontally spaced compartments of a selected one of the vertically spaced tiers of the chicken receiving coop 76. A brush assembly 51, comprising spaced pairs of contra-rotating brushes 52 and 53, (see FIG. 6) is sequentially arranged adjacent each of the five tiers 1–5 and positioned as shown in FIGS. 6 and 7 at the opening leading into each of the coop compartments. As best seen illustrated in FIGS. 1 and 6–8, the brushes 52, 53 each have resilient radial elements depending from an axial shaft 55. A chain drive is connected to the shaft 55 to be driven by hydraulic motors 56. The motors 56 and drive tram therefor are mounted to rotate axially the six coacting shafts 55 that are supported from the carriage 43 of FIGS. 1 and 5.

Door closer 57 of FIGS. 1 and 6 is mounted to pivot about a journaled shaft 58 concurrently with the sequential vertical repositioning of the brushes 52, 53 of brush assembly 51. This action closes the door of the last filled coop tier while pivotally rotating the entire brush assembly out of the path of the coops in order to avoid contact with the coop structure as the carriage 43 moves the divider apparatus 46 from the filled tier up to the next adjacent empty next coop tier, as will be more fully appreciated later on herein.

In FIG. 2, a pair of parallel vane-like rudders 59, 59' are attached in aligned relationship respective to one another. The ends of a spreader bar 60 are journeled to the free ends of the vane-like rudders to maintain the spacing therebetween. A hydraulically actuated piston assembly (not shown) is connected at 60' for pivoting the vanes about pivots 61, 61' which effects oscillatory motion thereinto. The vanes therefore acquire equal distribution of the chickens passing along the intermediate conveyor system, and then through the transfer and discharge means 46, and finally into the appropriate compartments of a tier.

As seen in the illustration of FIG. 2, together with FIGS. 6 and 8 of the drawings, the chickens are received from the chute 31 and are forced to travel along the path defined by the parallel vanes 59, where they are transferred onto the last conveyor 42 located below and immediately upstream of the brushes 51. The pairs of brushes 52, 53 separate the accumulated small group of chickens into either of the three separate rows of traveling chickens; ie, through the three sets of brushes. Hence, the chickens of either row are discharged sequential from between each pair of contra-rotating brushes 52, 53 and are thereby moved directly into the appropriate compartments of a selected tier of the coop.

Figure 11:
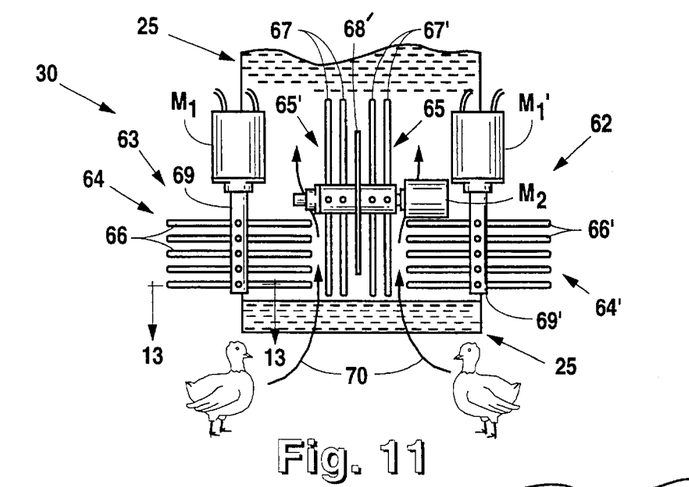
FIG. 11 is a front view of part of the apparatus of FIGS. 1 and 2.
Figures 12, 13:
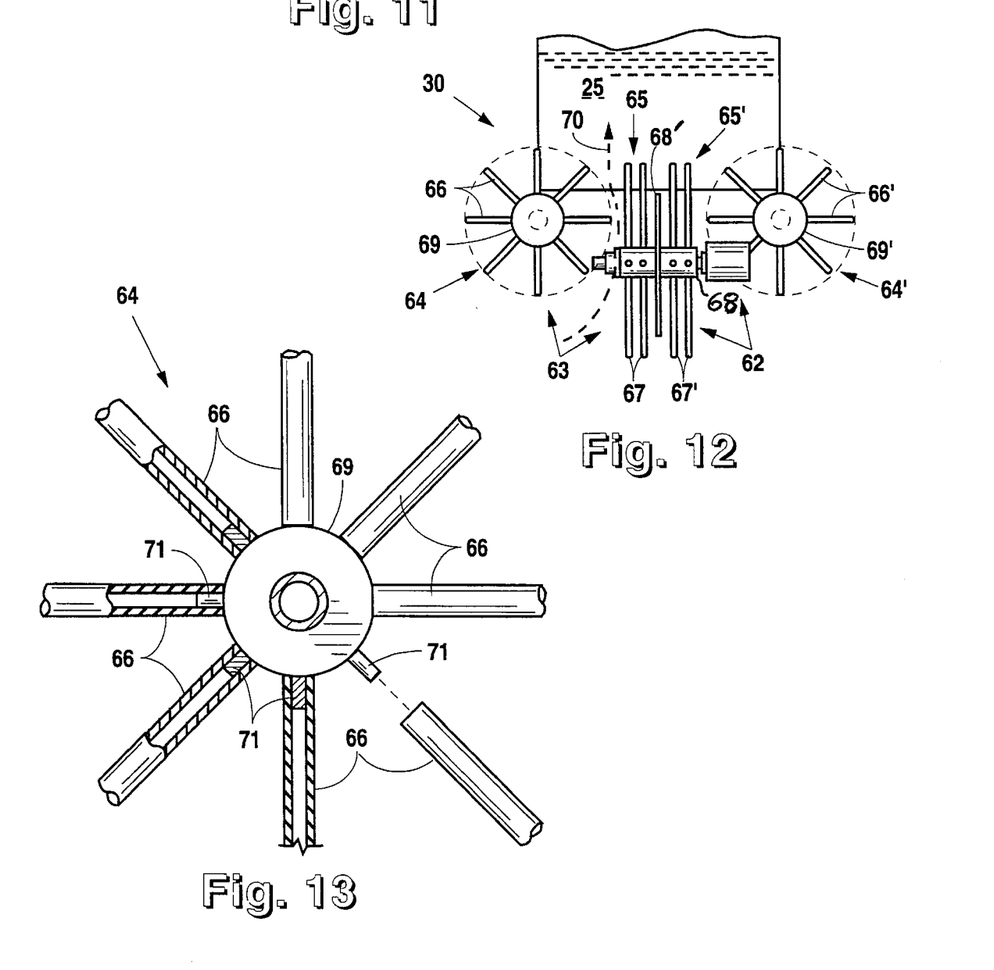

In FIGS. 1–3 and 11–13, the chicken gathering apparatus 30, made in accordance with this invention, comprises two adjacent gathering devices that are arranged in confronting relationship as seen at 62 and 63. As best seen in FIGS. 11–13, each of the two gathering devices 62 and 63 include opposed pairs of rotatable sweep members 64, 64' and 65, 65'; respectively; having radially arranged, resilient, finger-like elements 66, 67, and 66', 67', respectively; extending radially from a multiplicity of mounting nipples 71. In FIG. 13, together with FIGS. 11 and 12, the nipples 71 are affixed to radiate from the illustrated axially located shafts 68, 69, and 69', respectively; for securing the resilient fingers 66 and 67 thereon. The resilient fingers 66 and 67 engage and urge chickens to move sequentially through a deformable passageway 70 formed as a chicken passes therebetween; as seen illustrated in FIGS. 11 and 12. The spacing between the rotatable sweep members 64, 65 and 64', 65' at 70 is about one-half the width of a chicken, or about 2.5 inches. This is adequate for accommodating a six pound chicken. The relative position of the shaft ends can be adjusted to change the spacing in order to accommodate other size chickens, as may be desired.

The vertical shafts 69, 69' contra-rotate respective to one another, and preferably rotate in synchronization with one another; and, more or less in synchronization with the co-acting horizontal axis sweep members 65, 65' when comparing the peripheral velocity of the outer ends of the fingers respective to the associate lowermost fingers 66, 66' of the vertical axis sweep member 64. A divider 68' can be included to divide the fingers 67 from the fingers 67', if desired. The provision of a single pair of sweep members 64 and 65, with or without the divider 68' is considered within the comprehension of this invention. The divider, when included in the combination, can be a plastic disk having an outside diameter less that the overall diameter of the sweep members 65, 65'.

It was found that the resilient fingers 66 and 67 of FIGS. 11–13 can advantageously be made from a length of commercially available, fabric reinforced, synthetic rubber tubing having the near marginal end telescopingly forced about the illustrated cylindrical holders or nipples 71 that are affixed to the axial member by welding. The rubber tubing used for making fingers 66 can be commercially available automotive water heater or fuel hose having a length of 10–15 inches and a diameter of ½ to ⅝ inches; while the hose for fingers 67 is slightly larger and has a length of 12–18 inches and a diameter of ⅝–¾ inches.

There are a series of 55 nipples arranged in 11 longitudinal or axially arranged rows, with each of the rows having 5 nipples therein, and with the rows being arranged circumferentially about the axial shaft member. The nipples of adjacent rows are staggered respective to one another, as shown, and are of a length and diameter respective to the hose inside diameter so that a compression fit is realized therebetween which secures the hose end fastened securely in place respective to the axially rotating inner cylindrical shaft. An occasional chicken may inadvertently be caught between the sweep members 65 and the end of the conveyor 25, respectively, and harmlessly rotated onto the conveyor 25.

There are 32 nipples rigidly mounted on each of the marginal opposed ends of the common shaft 68, arranged in two circumferential rows 67, with there being 16 nipples in each said circumferential row as shown.

In FIGS. 1 and 5, together with FIGS. 7 and 8, a chain lift 72 is suitably connected to elevate the carriage 43 of the transfer divider and discharge means 46 by releasable engagement with the illustrated J-hook 73. As particularly seen in FIG. 5, the J-hook 73 is affixed to the carriage structure at a location to intercept and lift the complimentary configured curved member 40' during the upward travel of the transfer divider and discharge means 46, thereby elevating the transfer divider and discharge means 46. The curved member 40' is arranged concentrically respective to the conveyor journal 40.

A lower stop 74 is positioned at the lower end of the pivoted support frame 37 for engaging the main frame 12 during its downward travel to thereby position journal 40 at its lowermost position of travel. As seen at 40' in FIG. 8, the pivoted support frame 37 remains at this lower position while the carriage 43 continues to descend to the adjacent bottom-most tier (see FIGS. 1, 7 and 8). Chain 75 of FIG. 5 is meshed with the illustrated sprockets to lift the carriage 43 in a manner similar in action to the lifting of the forks of a prior art forklift.

In FIGS. 7 and 8, a multi-tiered coop 76 is removably positioned with the open doors 79 being placed adjacent to and confronting the discharge means 46, as shown. It will be noted that the open coop doors span the intervening space between the coop entrance and the rotating brushes 51 of the transfer divider and discharge means 46, thus providing a temporary floor for containment of the rows of chickens simultaneously traveling from the transfer divider and discharge means 46 into the compartments 77 of coop 76.

Figure 9:
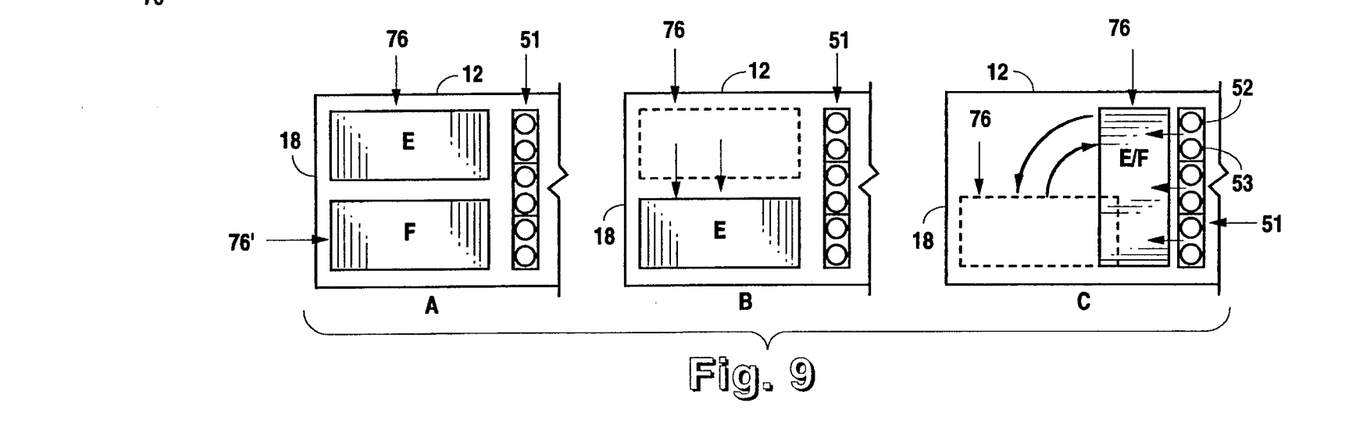
Figure 10:
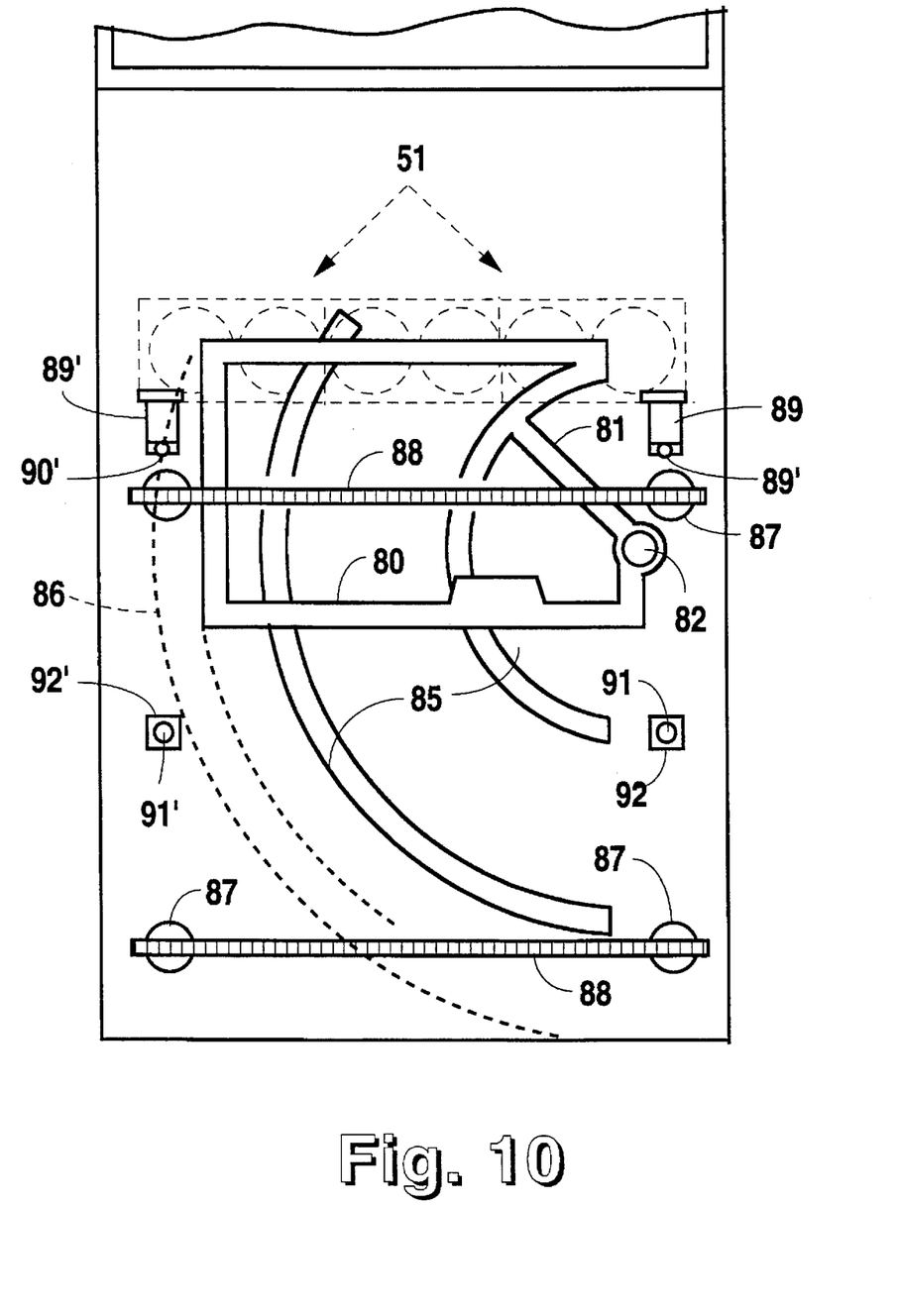
FIG. 10 is a broken, top plan view of the rear part of the apparatus of FIG. 2 illustrating additional features of the invention.

The details of the mechanism that automatically position coops 76 on the rear part 18 of main frame 12 is illustrated in FIGS. 2, 9 and 10, together with other figures of the drawing. As particularly illustrated in FIGS. 2 and 10, a coop rotator and support frame 80 has rotator linkages 81 integrally attached thereto for pivoting frame 80 about a pivot journal 82. An actuator cylinder 84 interconnects the rotator linkages 81 of support frame 80 to a main frame member at journal 83 (see FIG. 2) for controllably pivoting the support member from a lateral into a longitudinal position, and vice versa, as is illustrated in FIGS. 2, 9B, and 10. Two curved supports 85, as seen in FIGS. 2 and 10, slidably support the coop support frame 80 for movement thereon along the dot-dash path indicated by numeral 86. As seen in the illustrated positions of FIGS. 9A, 9B and 9C, the coop support frame 80 pivotally supports and moves the coop 76 from one to the other of the illustrated lateral and longitudinal positions, which are perpendicular to one another.

In FIG. 10, four air lifters, seen illustrated at 87, are mounted to the main frame 12 in underlying relationship respective to the spaced parallel endless chain apparatus 88. One of the four air lifters engages one of the ends of a chain apparatus 88 to elevate the upper run of each of the chain apparatus from a retracted position, where the upper runs of the chains are free of the coop, into an extended position, in which the upper run engages and supports the bottom of a coop. This elevates the coop above the intervening mechanisms, whereupon the chain apparatus can then laterally move the coop, and finally sets the coop down onto the coop rotator and support frame 80. Therefore, the pair of endless chain apparatus 88 are arranged to move a coop from the empty position E of FIG. 9A onto the coop support frame 80 (FIG. 9B), and vice versa in accordance with the teachings of FIGS. 2, 9 and 10.

After the empty coop has been rotated 90 degrees into the lateral position in the illustrated manner of FIGS. 2 and 9C, it is then tilted towards the rear of the main frame (see FIG. 7). This is accomplished by apparatus 89 for tilting, and apparatus 90 for weighing the coop 76, as seen in FIGS. 7 and 10. In FIG. 10 there are two forward coop filters 89 having load cells 90 mounted thereon, and two rear coop tilters 91 also having load cells 92 mounted thereon. All four of the tilters 90, 91; 90', 91', are pivotally mounted to the main frame and include means connected thereto by which they are pivoted in order to elevate the coop 76 into an inclined position as best seen illustrated in FIG. 7. The forward filter 89 and load cells 90 thereof elevate the coop a large amount as compared to the rear filter 91, 91' and load cells 92, 92' in order to position the coop entrances along a plane 79' that is spaced from and parallel to the plane 55' in which the confronting discharge means 46 travels, in accordance with FIGS. 7 and 8. Also see the forward tilter 89 and load cells 90 in FIG. 1.

In FIGS. 1, 2, 3 and 10, the rear wheels 93 are seen to be mounted to a telescoping section 93' that forms the rear axle. The axle is supported at 94 from the main frame structural members, and the axle telescopes together and apart to increase the width of rear part of the frame, thereby accommodating the movement of the coops 76 while at the same time retaining a low overall profile. Therefore the wheels telescope together an amount to reduce the width of the machine to the legal road limit, and telescopes the wheels apart sufficiently to accommodate the operation of the coops as set forth in conjunction with FIGS. 9 and 10.

In FIG. 1, a computer means 96 is connected to receive signals from a multiplicity of sensors 97, such as may be related to various position sensors seen at 97' in FIG. 7, and weight sensors as seen at 90, 90', 91, 91' in FIG. 10, for example. The computer is programmed to send an actuating signal at 98 to the air and electrical devices as a control signal.

OPERATION

Figure 3:
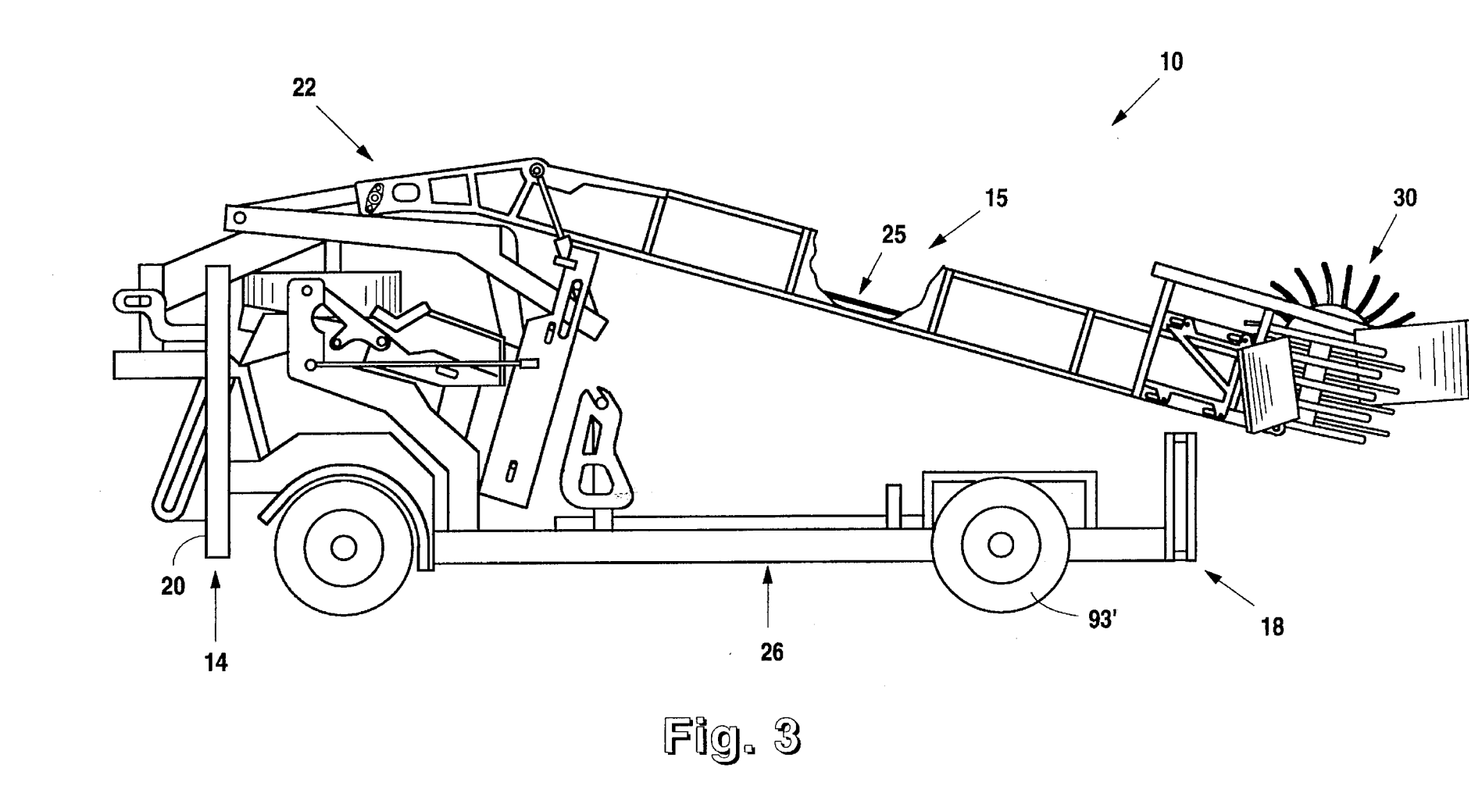
FIG. 3 is a side view showing the side opposite of FIG. 1, with the apparatus being in an alternate configuration.
Figure 4:
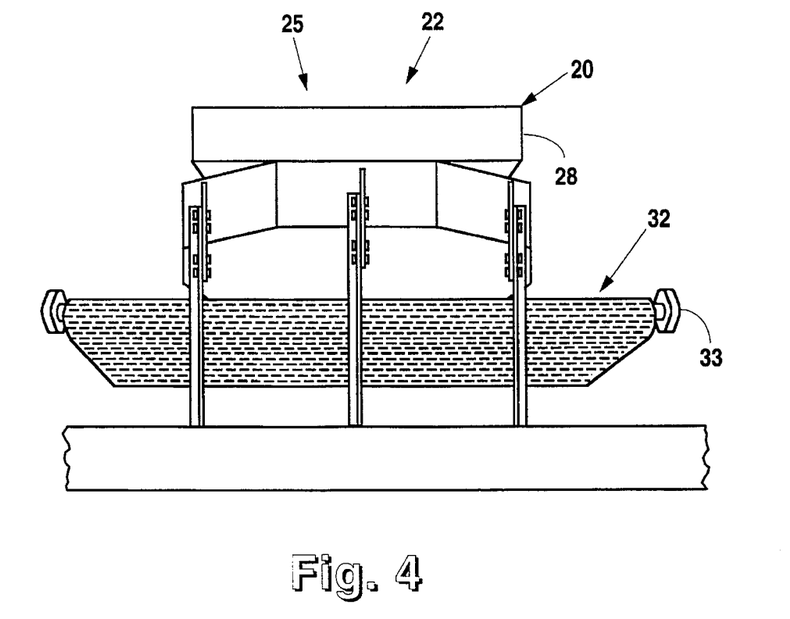
FIG. 4 is an isolated, fragmentary, detailed, front view of part of the apparatus disclosed in FIGS. 1–3.

In operation, the apparatus 10 of this invention preferably is in the form of the illustrated vehicle which can be driven along the road to a chicken house where the boom is pivoted from the stored position of FIG. 3 into the working position illustrated in FIGS. 1 and 2. After the vehicle has been driven into the chicken house, the rear wheel axle is manipulated to allow the rear wheels of the vehicle to be telescoped apart into the operative configuration of FIG. 2, thereby providing adequate room for manipulation of the coops that are supported for movement on the rear part 18 of the main frame.

After the support frame apparatus of FIGS. 9 and 10 moves an empty coop into a lateral position (FIG. 9C) where it can be tilted as seen in FIG. 7 and 8, the gathering head 30 and the conveyors 25, 32, 38 and 42 are energized and the gathering head is moved into contact with the flock of chickens. This is achieved by the use of a remote control console (not shown) connected to the control panel at the computer 96, which is connected to control the action of the hydraulic motors and actuating cylinders of the gatherer, conveyor, and boom positioner. The chickens encounter the rotating brushes of the gathering head 30 and are thereby caught and transported onto the boom conveyor 25. The caught chickens travel up the boom conveyor and through the turn table that forms the pivoted end of the boom 22, where they gravitate onto the intermediate conveyor system. There the chickens are transported to a last conveyor associated with the transfer divider and discharge means 46.

In FIGS. 1 and 2, together with other Figures of the drawings, the transfer divider and discharge means 46 is suitably arranged respective to the discharge end 40 of the third conveyor 38 for receiving chickens that are moved along intermediate conveyors 32 and 38, and thereby transferred thereinto. At the last conveyor, the moving accumulation of chickens are forced along a path leading into selected ones of the pairs of brushes 52 and thence into appropriate compartments of a tier in order to proportionately distribute the weight of chickens contained within the coop 76.

It should be noted that the two conveyors 32 and 38 of the intermediate conveyor system are mounted to pivot about pivot point 42' that is arranged at the forward end of conveyor support member 45', while end 40 thereof is elevated vertically in order to be suitable positioned respective to the fourth conveyor 42, as already described herein.

During the time that the chickens are traveling along the intermediate conveyor system, the computer controlled oscillating vanes 59 control the flow path of the conveyed chickens which are evenly distributed by the oscillating vanes 59 as the chickens move towards the last conveyor 42. Accordingly, there is always an appropriate number of chickens ready to be transported along one of the three parallel paths from the last conveyor leading into each of the compartments of a tier.

Between the time intervals that the carriage 43 of the transfer divider and discharge means 46 is sequentially elevated into alignment with each succeeding tier of the tilted coop, the brushes and last conveyor thereof stop rotation, while the brushes are pivoted out of the path of the coop. Thus the discharge means 46 is first moved into the lowermost of the five illustrated positions suggested in FIGS. 1, 7 and 8, with this action being controlled by the computer 96 of FIG. 1 which senses weight distribution as well as vertical position of the discharge means 46.

Note in FIGS. 1 and 8 that the intermediate conveyor discharge end is aligned with the second tier of the coop 76 while the last conveyor of the discharge means 46 is aligned to deliver chickens into the lowermost tier of the coop. Consequently, when the apparatus is moved into this operative position, chickens discharged from the intermediate conveyor harmlessly fall the short distance (which is only one compartment high) to the last conveyor during the filling of the lowermost tier of the coop. In this manner the last or fourth conveyor 42 is always suitably aligned to receive chickens conveyed from the discharge end of the third conveyor 38 of the intermediate conveyor system.

It should be noted that carriage frame is mounted to the same structure as other components of the transfer divider and discharge means 46 and therefore travels therewith along a path that is parallel to one another and as defined by the longitudinal slots of the guide 49. Furthermore it should be appreciated that the chickens discharged from the intermediate conveyors 32 and 38 are evenly distributed by the continuously oscillating vanes 59 by which the chickens are guided and transferred as they are conveyed along the intermediate conveyors and onto the last conveyor 42, with the relative position therebetween being optumly maintained by the complex linkage, shown in FIGS. 1, 2 and 6–8.

The load cells (FIG. 10) signal the computer 96 when the compartments of each tier is adequately filled with chickens, whereupon the counter-rotating brushes 51 stop rotation, and then pivot about shaft 58, thereby causing door closure 57 to engage and close the appropriate coop door, and removing the brushes from contact with the coops. The discharge means 46 immediately moves into alignment with the second tier, the counter-rotating brushes are pivoted back into the position of FIGS. 6–8, and the operation again resumes, thereby filling the second tier with an appropriate number of chickens. Next, the brushes again stop rotation and pivot back into the retracted position, thereby again clearing the coop while closing the second door, and thereafter moving into operative position respective to the third tier.

As the discharge means 46 moves from the second to the third tier, it will be noted that the J-hook 73 of FIG. 5 engages member 40' located at the rear of the intermediate conveyor system and carries the conveyor end 40 therewith, thereby always maintaining proper alignment between the four conveyors. This action continues until all of the tiers of the coop have been filled, whereupon the coop is then moved into the upright position by retraction of the tilters 89. The coop is then manipulated back into the position of FIG. 9A by means of the before described coop rotator and support frame 85 and the spaced parallel endless chain apparatus 88 where it is exchanged for an empty coop in the before described manner.

The multi-tiered coop 76 is of standard dimensions and has 5 horizontal tiers 78 superimposed on one another, with there being three adjacent compartments 77 in each tier 78, each of which are brought into registry with the three pairs of rotating brushes of the transfer divider 46, thereby aligning each compartment opening with one of the parallel paths of chickens flowing from the transfer divider means. The compartments 77 preferably have individual, spring loaded doors 79 that work with an over the center action so that they remain in either the open or closed position to which they last were moved. Sometime a single door is provided across the entire opening into a tier 78.

Under normal conditions 1500 pounds of six pound fryers can be loaded into a single coop, with the chickens being distributed such that about 300 pounds of chickens is loaded into each tier, which calls for 50 chickens (50×6 pounds=300 pounds) to be divided among the three compartments of each of the tiers. Accordingly, approximately 17 six pound chickens are transported into a single compartment. Therefore, the three rows of chickens delivered into the three adjacent compartments of a tier by the transfer divider can be visualized as three parallel rows, each row being about 17 chickens in length. Hence, almost one chicken must be gathered each second at the gathering head 30 in order to fill the entire coop in less than 5 minutes. Further, either or both of the dual heads at 30 can be selectively operated to gather chickens from either or both sides of the gathering head. It will therefore be appreciated that another desirable feature of this invention is the allowance of a greater time interval that can be devoted to the careful mechanical gathering operation so that the caged chickens arrive at the processing plant uninjured.

FIGS. 9A, 9B and 9C illustrate the positioning and arrangement of the empty and full coops by the present invention, which speeds up this aspect of the operation. As particularly seen illustrated in FIG. 9A, during the operation of the present apparatus, and assuming that a coop 76' has been filled and rotated into a longitudinal position (F) respective to the main frame 12, the fork-lift brings an empty (E) coop 76 which is deposited adjacent the filled coop (F), and then the fork lift engages the full coop 76' (F) and carries it to a truck trailer, leaving behind the empty (E) coop. As soon as the full coop has cleared the main frame, and the rear gate closed, the computer is instructed to actuate the spaced parallel endless chain apparatus 88 (FIGS. 2 and 10) which lifts and moves the empty coop into position (E) of FIG. 9B. Then the empty coop is automatically lowered onto the coop rotator frame 80. Next, the frame 80 is pivoted into the lateral position of FIG. 9C, carrying the empty coop therewith. At this time the apparatus for tilting and weighing the coop 76, as seen at 89 and 90 in FIGS. 7 and 10, are pivoted into the elevated position so that the coop is engaged and lifted by the four load cells as it is tilted into a chicken receiving position, best seen illustrated in FIGS. 7 and 8.

As each successive tier of the coop accumulates approximately 300 pounds of chickens therein, the incoming load signal from 97 is sensed by the computer at 96 which instructs the panel 98 to stop rotation of the brushes and the last conveyor, then to pivot the brushes, and then to move the carriage to the next elevation that coincides with the next empty tier.

After all of the tiers of the coop are filled in the before described manner, the coop is returned to the upright position, and then pivoted by the support frame back into the longitudinal position at the rear of the main frame 12 (at 26, see FIGS. 9A and 9C) where it is immediately engaged and lifted by the waiting forklift, which, by this time, has previously placed the next empty coop into the illustrated position of FIG. 9A, whereupon the before described process is repeated.

A safety gate is attached to and forms the terminal end of the vehicle. The gate must be open in order to access the coop storage area. A switch means is connected to interrupt the operation of the conveyors and the vehicle propulsion means while the gate is in the open position.

I claim:

1. Apparatus for cooping chickens by translocating the chickens from within a chicken growing area into each compartment of a multi-tiered coop, comprising:

a main frame having a forward end, a central part, and a trailing end; an elongated boom having a pivoted end opposed to a gathering end, a first conveyor means supported along the length of said boom; journal means attaching said pivoted end to said main frame forward end such that said gathering end can be moved in a vertical and a horizontal plane; and, means for removably supporting a multi-tiered coop adjacent said main frame trailing end;

a chicken gathering apparatus supported from said boom gathering end for gathering any chickens that come in contact therewith onto said first conveyor means; said first conveyor means being adapted to move chickens from said gathering end to a discharge end located at said pivoted end thereof;

an intermediate conveyor system having a chicken receiving end opposed to a chicken discharge end, means positioning the receiving end of the conveyor system respective to the discharge end of said first conveyor means for receiving chickens from the discharge end of said first conveyor;

a transfer divider means for receiving chickens discharged from the discharge end of the intermediate conveyor system and dividing the chickens to move along one of a plurality of parallel paths;

elevator means including carriage means to which said transfer divider means is mounted for positioning said transfer divider means respective to the tiers of a coop and to the parallel paths by which chickens discharged from the transfer divider means are sequentially transferred into the tiers of the coop.

2. The apparatus of claim 1 wherein said transfer divider means comprises a plurality of pairs of contra-rotating sweep members having radially arranged elements thereon for engaging and urging a chicken to move between the sweep members; there being one pair of sweep members for each of said parallel-paths, there being one parallel path for each compartment of each tier of a coop.

3. The apparatus of claim 2 wherein said chicken gathering apparatus comprises a pair of rotatable sweep members, each having a central shaft with there being radially arranged elements attached thereto and extending therefrom for engaging and urging a chicken to move therethrough;

one of said sweep members of said pair of rotatable sweep members is rotated about a horizontal axis while the other sweep member is rotated about a vertical axis, with the vertical and horizontal axis being spaced respective to one another to bring the outer ends of said radially arranged elements of said pair of rotatable sweep members into close proximity of one another whereby a chicken entering between said pair of rotatable sweep members is moved therethrough and onto said first conveyor means.

4. The apparatus of claim 2 wherein each compartment of the multi-tiered coop includes a coop door: wherein said plurality of pairs of contra-rotating sweep members are rotatably mounted on said carriage means; means supporting said sweep members from said carriage means for limited rotation of said sweep members about a horizontal axis; whereby, the sweep members are moved from the path of said multi-tiered coop when it is moved into said first position, and means responsive to rotation of the sweep members for closing the coop door.

5. The apparatus of claim 1 wherein there is a guide means pivotally mounted adjacent the discharge end of the boom conveyor and extending longitudinally along the surface of the intermediate conveyor for guiding and distributing chickens for said transfer divider means; said guide means include spaced vertically arranged vanes having pivoted end journaled in fixed relationship respective to the main frame, and means operably connected to said vanes for oscillating the end of the vanes that is opposed to the pivoted end thereof.

6. The apparatus of claim 5 wherein said trailing end of said main frame includes a trailing marginal end: wherein the multi-tiered coop includes compartment doors: and wherein said transfer divider means comprises a plurality of pairs of contra-rotating sweep members having radially arranged elements thereon for engaging and urging chickens to move between the sweep members; and, further including mount means by which said multi-tiered coop is removably mounted on the trailing marginal end of said main frame, and is rotated from a first into a second position to thereby arrange the compartment doors adjacent the plurality of pairs of contra-rotating sweep members of said transfer divider means, where the chickens are moved into the compartments of said multi-tiered coop to said first position at the trailing marginal end of said main frame.

7. The apparatus of claim 6 wherein said mount means, after rotating said multi-tiered coop into said first position, tilts said coop at an angle respective to said plurality of pairs of contra-rotating sweep members of said transfer divider means to force any chickens traveling therefrom to gravitate towards the rear of the coop; and, means mounted from said frame for weighing said coop and for moving said transfer divider means from a full tier to an empty tier in response to a predetermined weight increase thereof.

8. The chicken gathering apparatus of claim 1 wherein said chicken gathering apparatus includes a gathering head; and wherein said gathering head comprises a pair of rotatable sweep members, each having a central shaft, with there being radially arranged elements attached thereto and extending therefrom for engaging and urging a chicken to move there through; and said radially arranged elements respectively having outer ends:

one of said sweep members of said pair of rotatable sweep members is rotated about a horizontal axis, while the other sweep member of said pair of rotatable sweep members is rotated about a vertical axis, with the vertical and horizontal axis being spaced respective to one another to bring the outer ends of the radially arranged elements of the pair of members into close proximity of one another; whereby, a chicken entering between said pair of rotatable sweep members is forced therethrough and onto said first conveyor means.

9. A method by which a group of chickens can be translocated from an area which they are living, into the compartments of a multi-tiered chicken coop, comprising the steps of:

sequentially gathering the chickens onto a first moving conveyor where the chickens are elevated; and then depositing the elevated chickens onto a moving conveyor system that is arranged to receive the chickens from the first recited conveyor, and then moving the deposited chickens to a chicken discharge guide means for guiding and discharging the chickens into the chicken coop;

dividing the chickens into one of a plurality of parallel paths arranged in a common plane as the chickens travel towards the chicken discharge guide means;

mounting a multi-tiered coup adjacent the chicken discharge guide means in opposition to the conveyor system; and, elevating the discharge guide means into a position to bring the discharge guide means into register with an opened door that forms the entrance into a coop tier; delivering the chickens along the plurality of parallel paths into a selected tier of the coop and then closing the coop door after the coop is filled with chickens in response to movement of the discharge guide means into the next operable position.

10. The method of claim 9 and further including the steps of:

carrying out the step of sequentially gathering the chickens onto a first moving conveyor by mounting a pair of gathering rotatable brushes on one end of an elongated boom having opposed ends;

pivotally mounting the other end of the boom to a vehicle main frame to thereby enable the gathering brushes to be moved in any direction;

moving the gathering brushes into contact with the chickens contained within said area and thereby catching the chickens and passing the chickens between the rotating brushes, and discharging the caught chickens onto the upper surface of the boom;

moving the caught chickens along the upper surface of the boom by supporting an elongated boom conveyor on the boom upper surface between the opposed ends thereof;

dropping the caught chickens through a hollow pivot formed through said other end of the boom that is mounted to the vehicle main frame;

removably supporting a multi-tiered coop on said vehicle; and, accumulating the chickens on a last conveyor means to provide a relatively small group of chickens;

dividing the small group of chickens into a plurality of parallel rows of chickens which are moved into the entrance of a tier of the coop, thereby uniformly filling the compartments of the coop.

11. The method of claim 10 and further including the steps of:

supporting the chicken discharge guide means to receive chickens from the discharge of the conveyor system;

changing the elevation of the transfer divider means respective to the elevation of the tiers of the coop to bring the discharge of the transfer divider means into registry with respect to the opening into a tier;

gathering chickens onto the boom conveyor by mounting the pair of rotatable brushes about spaced axis arranged perpendicular respective to each other; encountering chickens with the rotating brushes to force them to move along a passageway formed between the brushes as they pass therethrough and thereby moved onto the boom conveyor.

12. The method of claim 11 and further including the steps of:

rotating said multi-tiered coop into said first position; tilting said coop at an angle to align the openings thereof with said plurality of pairs of contra-rotating sweep members of said transfer divider means, and thereafter forcing the chickens to gravitate towards the rear of the coop.

13. The method of claim 10 wherein said transfer and divider means divides the chickens into parallel rows as follows:

mounting a pair of contra-rotating sweep members for each said row of chickens;

radially arranging elongated resilient elements respective to a central axis thereof for engaging and urging a chicken to move between the sweep members;

encountering chickens with the rotating elements to force them to move along a passageway formed between the sweep members as they pass therethrough and are thereby moved into the coop.

14. The method of claim 13 and further including the steps of:

providing one pair of sweep members for each said parallel path; and connecting said plurality of pairs of contra-rotating sweep members for limited rotation about a horizontal axis whereby the sweep members are moved out of the path of said multi-tiered coop while at the same time the coop door is closed.

15. The method of claim 13 and further including the steps of:

rotatably mounting spaced pairs of rotatable sweep members at the receiving end of the first conveyor; said rotatable sweep members have radially arranged elements thereon;

rotating said pair of rotatable sweep members about a horizontal axis while the other two sweep members are rotated about a vertical axis, with the vertical and horizontal axis being spaced respective to one another to bring the outer ends of the radially arranged elements of the pair of members into close proximity of one another whereby a chicken entering between said pair of rotatable sweep members is forced therethrough and onto said first conveyor means.

16. The method of claim 10 and further including the steps of:

removably supporting a multi-tiered coup within which a plurality of chickens are to be housed; gathering chickens onto a first conveyor, and moving the chicken along the conveyor while elevating the chickens;

dropping the elevated chickens onto a conveyor system; placing a multi-tiered coup adjacent a chicken discharge conveyor and bringing the discharge into register with a coop entrance; moving the coop closure member into a closed position in response to the chicken discharge conveyor being repositioned.

17. The method of claim 9 and further including the steps of:

carrying out the step of sequentially gathering the chickens by entering the interior of a chicken house within which chickens are growing with the boom conveyor having gathering brushes thereon for sequentially translocating chickens from an area onto the moving boom conveyor;

gathering chickens onto the boom conveyor by mounting the pair of rotatable brushes about spaced axis arranged perpendicular respective to each other; and, encountering chickens with the rotating brushes to force them to move along a passageway formed between the brushes as they pass therethrough and are thereby moved into place on the boom conveyor;

engaging the conveyed chickens with a plurality of pairs of contra-rotating sweep members having radially arranged elements thereon for engaging and urging chickens to move between the sweep members and directly into one of the tiers.

18. The method of claim 9 and further including the steps of:

mounting the plurality of pairs of contra-rotating sweep members of said transfer divider means onto a vehicle having a main frame, and said main frame having a trailing marginal end;

removably mounting said multi-tiered coop on the trailing marginal end of said main frame; rotating the coop from a first into a second position to thereby arrange the compartment doors adjacent the plurality of pairs of contra-rotating sweep members of said transfer divider means, and then moving the chickens into the compartments of said multi-tiered coop, and thereafter returning said multi-tiered coop into said first position at the trailing marginal end of said main frame.

19. In an apparatus for cooping chickens by translocating the chickens from a chicken growing area into a multi-tiered coop, the improvement comprising:

a main frame having a forward end, a central part, and a trailing end; an elongated boom having a pivoted end opposed to a gathering end, a first conveyor means supported along the length of said boom for moving chickens from said gathering end to said pivoted end; said first conveyor means including a discharge end; and journal means attaching said pivoted end to the forward end of said main frame such that said gathering end can be moved in a vertical and in a horizontal plane;

a chicken gathering apparatus supported on said boom gathering end for gathering any chicken onto said first conveyor means that may be brought into contact therewith; said first conveyor means adapted to move chickens from said gathering end to said discharge end located at said pivoted end;

a conveyor system having a chicken receiving end opposed to a chicken discharge end, means positioning the conveyor system chicken receiving end respective to the discharge end of said first conveyor means for receiving chickens discharged therefrom;

a transfer divider means for receiving chickens discharged from the discharge end of the conveyor system and dividing the chickens to move along a plurality of horizontal parallel paths;

means removably supporting a multi-tiered coop adjacent the main frame trailing end;

elevator means positioning said transfer divider means respective to the tiers of the coop and to the horizontal parallel paths for transferring chickens discharged from the divider means into a selected tier of the coop;

and means changing the slope of the conveyor system to dispose the discharge end thereof at an elevation which aligns the conveyor system discharge end with the transfer divider means in such a manner that chickens discharged from the conveyor system discharge end are received by the transfer divider means and thereafter directed into a tier of the coop.

20. The apparatus of claim 19 wherein said transfer divider means comprises a plurality of pairs of contra-rotating sweep members having radially arranged elements thereon for engaging and urging chickens to move therethrough; there being a pair of contra-rotating sweep members for each of said parallel paths discharged from the divider means.

21. The apparatus of claim 20 wherein said chicken gathering apparatus comprises a pair of rotatable sweep members, each having a central shaft with there being radially arranged elements attached thereto and extending therefrom for engaging and urging a chicken to move therethrough and said radially arranged elements respectively having outer ends;

one of said sweep members of said pair of rotatable sweep members is rotated about a horizontal axis while the other sweep member is rotated about a vertical axis with the vertical and horizontal axis being spaced respective to one another to bring the outer ends of the radially arranged elements of the pair of members into close proximity of one another whereby a chicken entering between said pair of rotatable sweep members is moved therethrough and onto said first conveyor means.

22. The apparatus of claim 19 wherein said chicken gathering apparatus comprises a pair of rotatable sweep members on opposed sides of the gathering end of the boom for moving two parallel rows of chickens onto the gathering end of the boom conveyor; each sweep member having radially arranged elements attached to a rotating shaft thereof for engaging and urging chickens to move between the pair of rotatable sweep members;

one of said sweep members of said pair of rotatable sweep members is rotated about a horizontal axis while the other sweep member of the pair is rotated about a vertical axis, with the vertical and horizontal axis being spaced respective to one another to bring the outer ends of the radially arranged elements of the pair of members into close proximity of one another whereby a chicken entering between said pair of rotatable sweep members is moved therethrough and onto said first conveyor means.

23. The apparatus of claim 22 wherein is included a first conveyor frame having a forward end: wherein is included a second conveyor frame having a forward end; wherein is included discharge means for discharging chickens; and wherein said conveyor system comprises a second and a third conveyor supported to said first conveyor frame, the receiving end of said second conveyor is mounted to the forward end of said first conveyor frame, the receiving end of said third conveyor is mounted to the forward end of said second conveyor frame, and a fourth conveyor is mounted to receive chickens from the conveyor system and to convey the chickens to the discharge means, the discharge means includes a plurality of pairs of brushes, means counter-rotating each brush of said pair and arranged to discharge a chicken into a compartment of a coop.

24. The apparatus of claim 19 wherein said chicken gathering apparatus comprises a pair of rotatable sweep members, each having a central shaft with there being radially arranged elements attached thereto and extending therefrom for engaging and urging a chicken to move therethrough;

one of said sweep members of said pair of rotatable sweep members is rotated about a horizontal axis while the other sweep member is rotated about a vertical axis, with the vertical and horizontal axis being spaced respective to one another to bring the outer ends of the radially arranged elements of said pair of rotatable sweep members into close proximity of one another whereby a chicken entering between said pair of rotatable sweep members is forced therethrough and onto said first conveyor means.

25. The apparatus of claim 19 wherein said transfer divider means comprises a plurality of pairs of contra-rotating sweep members having radially arranged elements thereon for engaging and urging a chicken to move between the sweep members; there being one pair of sweep members for each said parallel path, there being one parallel path for each compartment of each tier of the coop.

26. The apparatus of claim 19 wherein there is a guide means pivotally mounted adjacent the discharge end of the first conveyor means and extending along the surface of the intermediate conveyor for guiding and distributing chickens for said transfer divider means.

27. The apparatus of claim 26 wherein said trailing end of said main frame includes a trailing marginal end; wherein the multi-tiered coop includes compartment doors; and wherein said transfer divider means comprises a plurality of pairs of contra-rotating sweep members having radially arranged elements thereon for engaging and urging chickens to move between the sweep members; and, further including mount means by which said multi-tiered coop is removably mounted on the trailing marginal end of said main frame, and is rotated from a first into a second position to thereby arrange the compartment doors adjacent the plurality of pairs of contra-rotating sweep members of said transfer divider means, where the chickens are moved into the compartments of said multi-tiered coop, and thereafter said mount means returns said multi-tiered coop to said first position at the trailing marginal end of said main frame.

\* \* \* \* \*